United States Patent [19]

Schott et al.

[11] Patent Number: 4,767,484
[45] Date of Patent: Aug. 30, 1988

[54] METHOD OF ATTACHING STRAIN GAUGES TO VARIOUS MATERIALS

[75] Inventors: Timothy D. Schott, Hampton; Robert L. Fox, Hayes; John D. Buckley, Newport News, all of Va.

[73] Assignee: The United States of America as represented by the Administrator of the National Aeronautics and Space Adminstration, Washington, D.C.

[21] Appl. No.: 74,792

[22] Filed: Jul. 17, 1987

Related U.S. Application Data

[63] Continuation-in-part of Ser. No. 831,372, Feb. 20, 1986, abandoned.

[51] Int. Cl.$^4$ .......................... B44C 1/14; B32B 31/12; B32B 31/20; B32B 31/26
[52] U.S. Cl. .................... 156/233; 156/247; 156/272.4; 156/274.8; 156/275.5; 156/307.7; 156/323; 156/344; 219/10.43; 219/10.53
[58] Field of Search .............................. 73/775; 338/2; 219/10.75, 10.79, 10.55 R, 6.5, 10.53, 10.43, 85 A, 9.5; 156/272.4, 274.4, 274.8, 275.5, 275.7, 297, 247, 299, 249, 307.1, 307.7, 230, 233, 239, 323, 307.3, 311, 330, 344, 289

[56] References Cited

U.S. PATENT DOCUMENTS

| | | | |
|---|---|---|---|
| Re. 32,571 | 1/1988 | Burger | 156/272.8 |
| 2,899,658 | 8/1959 | Bean, Jr. | 156/297 |
| 3,242,026 | 3/1966 | Saxton | 156/272.4 |
| 3,433,699 | 3/1969 | Rumble | 156/580 |
| 3,657,038 | 4/1972 | Lightfoot | 156/272.4 |
| 3,790,735 | 2/1974 | Peters, Jr. | 219/10.75 |
| 3,916,055 | 10/1975 | Wagner | 156/272.4 |
| 3,996,092 | 12/1976 | Sarazin | 156/300 |
| 4,407,686 | 10/1983 | Cook | 156/294 |
| 4,521,659 | 6/1985 | Buckley | 156/272.4 |
| 4,539,059 | 9/1985 | Burger | 156/272.8 |

Primary Examiner—Merrell C. Cashion, Jr.
Attorney, Agent, or Firm—George F. Helfrich; John R. Manning; Charles E. B. Glenn

[57] ABSTRACT

A method is provided to bond strain gauges 6 to various materials. First, a tape 9 with an adhesive backing 10 is placed across the inside of fixture frame 8. Strain gauge 6 is flatly placed against adhesive backing 10 and coated with a thin, uniform layer of adhesive 5. Tape 9 is then removed from fixture frame 8 and placed, strain gauge side down, on the material to be tested. If the material is a high reluctance material 12, induction heating source 20 is placed upon tape 9. If the material is a low reluctance material 13, a plate 23 with a ferric side 21 and a rubber side 22 is placed, ferric side down, onto tape 9. Induction heating source 20 is then placed upon rubber side 22. If the material is an insulator material 14, a ferric plate 7 is placed on tape 9. Induction heating source 20 is then placed on ferric plate 7. Inductive heating source 20 then generates frequency from 60 to 70 kilocycles to inductively heat either low reluctance material 13, ferric side 21, or ferric plate 21 and provides incidental pressure of approximately five pounds per square inch to tape 9 for two minutes, thoroughly curing adhesive 5. Induction heating source 20, and, if necessary, plate 23 or ferric plate 7, are then removed from tape 9 after one minute. Tape 9 is then removed from bonded strain gauge 6.

12 Claims, 2 Drawing Sheets

METHOD OF ATTACHING STRAIN GAUGES TO VARIOUS MATERIALS

ORIGIN OF THE INVENTION

The invention described herein was made by employees of the U.S. Government and may be manufactured and used by or for the Government for governmental purposes without the payment of any royalties thereon or therefor.

This invention is a continuation-in-part of application Ser. No. 831,372 filed Feb. 20, 1986, now abandoned.

TECHNICAL FIELD OF THE INVENTION

The present invention relates to methods of bonding strain gauges to high reluctance, low reluctance and no reluctance structures.

BACKGROUND OF THE INVENTION

Conventional methods for bonding film gauges or strain gauges to be operated at elevated temperature are typically time consuming due to clamping and baking procedures used in those methods. Furthermore, because it is impractical to utilize an oven for curing adhesives in the field, different procedures and equipment are required. Prior art methods of mounting strain gauges involve the use of contact adhesives and epoxies to attach the strain gauge to the structural base. However, contact adhesives for mounting strain gauges are limited to low humidity environments during installation, low temperatures during usage of the strain gauge, and only permit about 90 days of useful data measurements. The epoxies used for attaching strain gauges to the base structures require the use of heat lamps, hair dryers or other electric heater devices to generate heat to cure the epoxies. The use of epoxy as a strain gauge bonding material usually requires a considerable amount of time and power. Another prior method uses a vacuum pressure applicator with a conduction heater. This process involves a large amount of pressure and many hours of preparation.

Accordingly, it is an object of this invention to quickly bond strain gauges to a variety of materials.

It is a further object of this invention to quickly bond strain gauges by using relatively low power.

It is a further object of this invention to quickly bond strain gauges in the field.

Other objects and advantages of this invention will become apparent in the specification and drawings which follow.

RELATED APPLICATIONS

The present invention describes a method which can be performed using the apparatus disclosed in U.S. Pat. No. 4,521,659 entitled "Induction Heating Gun" and owned by the assignee of the present application. The disclosure in this patent is incorporated herein by reference.

SUMMARY OF THE INVENTION

According to the present invention, the foregoing and additional objects are obtained by providing various methods for quickly bonding strain gauges to three varieties of materials. First, a tape with an adhesive backing is placed across the inside of a fixture frame. The strain gauge is then flatly placed pad side down against the adhesive backing and coated with a thin, uniform layer of adhesive. The tape is then removed from the fixture frame.

The next steps are dependent upon the type of material which is to be bonded. If a ferric material is to be bonded, the tape is placed, strain gauge side down, onto the surface of the material. If a low reluctance material such as aluminum is to be bonded, a plate with a rubber side and a ferric side is placed, ferric side down, onto the tape, which has been placed, strain gauge side down, onto the low reluctance material. If an insulator material such as fiberglass is to be bonded, a ferric plate is placed on the tape, which has been placed, strain gauge side down, onto the insulator material.

An induction heating gun, identified above, is then placed upon the tape and energized for two minutes to generate frequencies from fifty to sixty kilocycles, thereby locally heating the ferric material or plate beneath the strain gauge, thereby curing the adhesive on the strain gauge. The induction heating gun is then removed after one minute. Accordingly, the strain gauge is quickly bonded to the desired material.

DETAILED DESCRIPTION OF THE INVENTION

Figure 1:
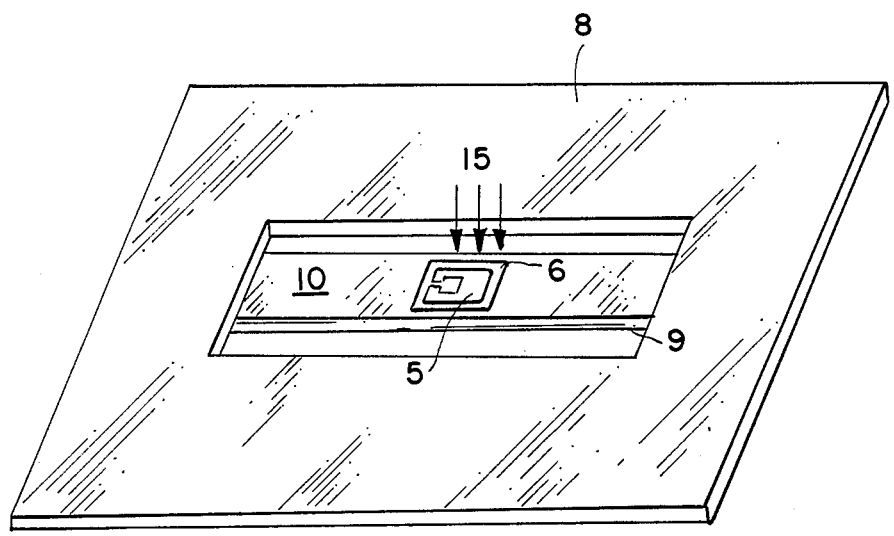
FIG. 1 is a perspective view of a fixture frame used to prepare a strain gauge for sending.

As illustrated in FIGS. 1-4, a method is illustrated for the bonding of strain gauges 6 to a wide variety of high reluctance ferric materials 12, low reluctance material 13, and a no reluctance insulator material 14. Referring now to FIG. 1, a fixture frame 8 is provided. A tape 9 having an adhesive backing 10 is placed across the inside of fixture frame 8. Tape 9 is preferably Kapton ® poliymide tape, commercially available from the E. I. DuPont de Nemours Corporation of Wilmington, Del. The pad side of strain gauge 6 is placed against the adhesive side 10 of tape 9, preferably with tweezers. Next, pressurized air 15 is blown onto strain gauge 6 to insure a flat placement against adhesive side 10. Next, strain gauge 6 is coated with a thin, uniform layer of adhesive 5. Adhesive 5 is preferably AE-10 two part epoxy composition, commercially available from Micro Measurements, Box 27777, Raleigh, N.C. Obviously, the tape 9 selected will depend on a combination of factors including the type of strain gauge 6 selected, the adhesive 5 desired, and the cure temperature of adhesive 5. In one specific embodiment of the invention, strain gauge 6 is also available from Micro Measurements and is described as a "sensing grid sandwiched between high temperature insulators for sensing strain in motion." Tape 9 is then removed from the inside of fixture frame 8 and is ready to be bonded to a wide variety of materials.

Figure 2:
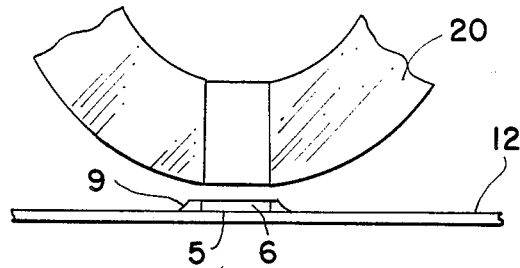
FIG. 2 is a schematic showing the bonding of a strain gauge to a ferric material.

The next steps are dependent upon the type of material to be secured. Referring first to FIG. 2, the bonding of strain gauge 6 to a high reluctance, poorly thermally conductive ferric material 12 is shown. Tape 9 is placed onto ferric material 12 such that adhesively coated strain gauge 6 is in intimate contact with the outer surface of ferric material 12. Next, inductive heating source 20 is placed flatly upon tape 9. Inductive heating source 20 generates heat within the ferric material 12 because of its high reluctance and poor thermal conductivity. This heat is transferred from the ferric material 12 through the strain gauge 6, which enhances the curing of adhesions.

Figure 3:
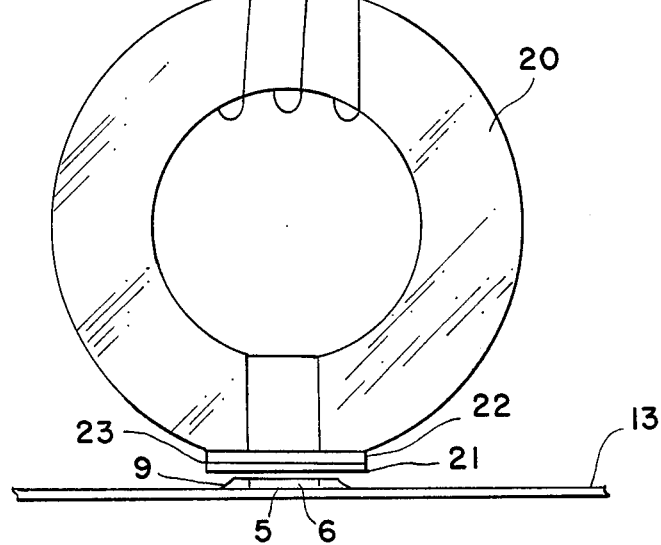
FIG. 3 is a schematic showing the bonding of a strain gauge to a low reluctance material.

Referring next to FIG. 3, the bonding of strain gauge 6 to a highly thermally conductive, low reluctance material 13 such as aluminum is shown. Tape 9 is placed onto ferric material 12 such that adhesively coated strain gauge 6 is in intimate contact with the outer surface of low reluctance material 13. Next, a thin plate 23, comprised of a ferric side 21 approximately ⅛ of an inch thick and a rubber side 22, is placed on tape 9 such that ferric side 21 contacts said tape 9. Next, inductive heating source 20 is placed flatly on the rubber side 22 of the thin plate 23. Inductive heating source 20 generates heat within the ferric side 21. This heat is then transferred to the strain gauge 6, which enhances the curing of adhesive 5. The rubber side 22 serves as an insulator to prevent undesirable heating of material 13.

Figure 4:
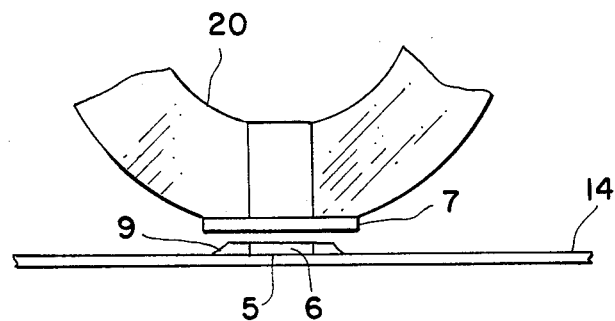
FIG. 4 is a schematic showing the bonding of a strain gauge to an insulator material.

Referring now to FIG. 4, the bonding of strain gauge 6 to a poorly thermally conductive, no reluctance insulator material 14 such as fiberglass is shown. Tape 9 is placed onto insulator material 14 such that adhesively coated strain gauge 6 is in intimate contact with the outer surfaces of insulator material 14. Next, a ferric plate 7 is placed onto tape 9. Next, inductive heating source 20 is placed flatly on ferric plate 7. Inductive heating source 20 generates heat within ferric plate 7. This heat is then transferred to strain gauge 6, which enhances the curing of adhesive 5. No rubber side is needed because heat will not be undesirably transferred through insulator material 14 because of the poor thermal conductivity of insulator material 14.

Preferably, inductive heating source 20 is the inductive heating gun described above. This induction heating gun may generate frequencies ranging from fifty to sixty kilocycles when supplied with only 200 watts of power. This frequency range is acceptable to the application of strain gauge 6, which is extremely sensitive to external energy sources such as a frequency derived load or heat energy.

Referring now to FIGS. 2-4, induction heating source 20 is energized to generate frequencies of fifty to sixty kilocycles and then inductively heating ferric material 12, ferric side 21, or ferric plate 7. This energization period should last for approximately two minutes. During this period, pressure of approximately five pounds per square inch is applied to tape 9 to insure contact between strain gauge 6, adhesive 5, and the material. This pressure is supplied by the weight of induction heating source 20 and, if necessary, manual pressure. After the energizing period, the induction heating source 20 and plate 23 or ferric plate 7, if used, are removed from tape 9 after a cooling period of approximately one minute. This cooling period allows a bonding of strain gauge 6 to the material via adhesive 5. Next, tape 9 is removed from strain gauge 6 and electrical leads (not shown) are attached to the bonded strain gauge 6 to perform standard strain testing.

Referring now to Table I, below, the instant method was used to bond strain gauge 6 onto low reluctance aluminum material 13 and stainless steel frame material 12. Both materials were in the form of cantilever beams.

TABLE I

| SPECIMEN MATERIAL* | TEST TEMPERATURE | TYPICAL % ERROR FULL SCALE | | |
|---|---|---|---|---|
| | | NON-LINEARITY | HYSTERESIS | ZERO SHIFT |
| | | Ideal** 0.05–01% Actual | Ideal** 0.02% Actual | Ideal** 0.2% Actual |
| 60–61 Aluminum | Ambient 121° C. | .124 .200 | ±.081 ±.250 | ±.200 ±.200 |
| 17–4 Stainless Steel | Ambient 204° C. | .225 .088 | ±.188 ±.175 | ±.200 ±.200 |

*Adhesive for all tests was AE-10 epoxy.
**The ideal standards are accepted manufacturers standards and may be found in Strain Gauge Technology by A. C. Winston and G. S. Hosliten, Applied Science Publication, London, 1982, pp. 27-28.

What is claimed is:

1. A method for bonding a strain gauge to a high reluctance, poorly thermally conductive material comprising the following steps:

placing a tape with an adhesive backing across the inside of a fixture frame;

placing a strain gauge, pad side down, flatly against said adhesive backing;

coating said strain gauge with a thin, uniform layer of adhesive;

removing said tape with said placed strain gauge from said fixture frame;

placing said tape onto an outer surface of a high reluctance, poorly thermally conductive material so that said adhesively coated strain gauge contacts said outer surface;

placing an inductive heating source which generates frequencies from approximately fifty to sixty kilocycles flatly upon said placed tape;

providing approximately five pounds per square inch of pressure upon said placed tape;

energizing said inductive heating source to locally heat said outer surface beneath said placed tape for approximately two minutes, thereby also curing said layer of adhesive;

removing said inductive heating source from said tape after approximately one minute to allow cooling, thereby allowing the bonding of said strain gauge to said outer surface;

removing said tape;

attaching leads to said bonded strain gauge to allow standard strain gauge testing;

whereby said strain gauge is quickly bonded to said high reluctance, poorly thermally conductive material.

2. The method of claim 1 wherein said step of placing said strain gauge, pad side down, flatly against said adhesive backing includes blowing pressurized air onto said strain gauge to insure a flat placement.

3. The method of claim 1 wherein said pressure of approximately five pounds per square inch is provided by the weight of said induction heating source placed upon said tape.

4. The method of claim 1 wherein said step of providing approximately five pounds per square inch of pressure includes placing said induction heating source upon said placed tape and manually applying the remaining required pressure to said placed induction heating source.

5. A method for bonding a strain gauge to a low reluctance, highly thermally conductive material comprising the following steps:
- placing a tape with an adhesive backing across the inside of a fixture frame;
- placing a strain gauge, pad side down, flatly gainst said adhesive backing;
- coating said strain gauge with a thin uniform layer of adhesive;
- removing said tape with said placed strain gauge from said fixture frame;
- placing said tape onto an outer surface of a low reluctance, highly thermally conductive material so that said adhesively coated strain gauge contacts said outer surface;
- placing a plate with a ferric side and a rubber insulating side, ferric side down, onto said placed tape;
- placing an inductive heating source which generates frequencies from approximately fifty to sixty kilocycles flatly upon said placed plate;
- providing approximately five pounds per square inch of pressure upon said plate;
- energizing said inductive heating source to locally heat the ferric side of said plate above said placed tape for approximately two minutes, thereby also curing said layer of adhesive on said strain gauge;
- removing said inductive heating source and said plate from said tape after approximately one minute to allow cooling, thereby allowing the bonding of said strain gauge to said outer surface;
- removing said tape;
- attaching leads to said bonded strain gauge to allow standard strain gauge testing;
- whereby said strain gauge is quickly bonded to said low reluctance, highly thermally conductive material.

6. The method of claim 5 wherein said step of placing said strain gauge, pad side down, flatly against said adhesive backing includes blowing pressurized air onto said strain gauge to ensure a flat placement.

7. The method of claim 5 wherein said pressure of approximately five pounds per square inch is provided by the weight of said induction heating source placed upon said plate.

8. The method of claim 5 wherein said step of providing approximately five pounds per square inch of pressure including placing said inductive heating source upon said placed plate and manually providing the remaining required pressure to said induction heating source.

9. A method for bonding a strain gauge to an insulator material with no reluctance and poor thermal conductivity comprising the following steps:
- placing a tape with an adhesive backing across the inside of a fixture frame;
- placing a strain gauge, pad side down, flatly against said adhesive backing;
- coating said strain gauge with thin, uniform layer of adhesive;
- removing said tape with said placed strain gauge from said fixture frame;
- placing said tape onto an outer surface of a insulator material so that said adhesively coated strain gauge contacts said outer surface;
- placing a ferric plate onto said placed tape;
- placing an inductive heating source which generates frequencies from fifty to sixty kilocycles flatly upon said placed ferric plate;
- providing approximately five pounds per square inch of pressure upon said placed ferric plate;
- energizing said induction heating source to locally heat the ferric plate beneath said placed tape for approximately two minutes, thereby also curing said layer of adhesive;
- removing said inductive heating source and said ferric plate from said tape after approximately one minute to allow cooling, thereby allowing the bonding of said strain gauge to said outer surface;
- removing said tape;
- attaching leads to said bonded strain gauge to allow standard strain gauge testing;
- whereby said strain gauge is quickly bonded to said insulator material.

10. The method of claim 9 wherein said step of placing said strain gauge, pad side down, flatly against said adhesive backing includes blowing pressurized air onto said strain gauge to insure a flat placement.

11. The method of claim 9 wherein said pressure of five pounds per square inch is provided by the weight of said induction heating source placed upon said ferric plate.

12. The method of claim 9 wherein said step of providing five pounds per square inch of pressure includes placing said inductive heating source upon said placed ferric plate and manually providing the remaining required pressure to said induction heating source.

* * * * *